United States Patent
Fujikura

[11] Patent Number: 5,909,536
[45] Date of Patent: Jun. 1, 1999

[54] RESOLUTION CONVERTER FOR DOT IMAGES

[75] Inventor: Syuiti Fujikura, Tokyo, Japan

[73] Assignee: Oki Data Corporation, Tokyo, Japan

[21] Appl. No.: 08/837,451

[22] Filed: Apr. 17, 1997

[30] Foreign Application Priority Data

May 10, 1996 [JP] Japan ................................. 8-116627

[51] Int. Cl.$^6$ .................................................. G03G 15/08
[52] U.S. Cl. ........................ 395/102; 382/299; 358/298
[58] Field of Search .................................. 382/298, 299, 382/300, 237; 358/298, 451, 456; 345/130, 132, 135

[56] References Cited

U.S. PATENT DOCUMENTS

| | | | |
|---|---|---|---|
| 3,573,789 | 4/1971 | Sharp et al. | 382/254 |
| 4,866,520 | 9/1989 | Nomura et al. | 358/140 |
| 4,885,786 | 12/1989 | Anderson et al. | 382/300 |
| 5,166,701 | 11/1992 | Yamada | 358/298 |
| 5,327,256 | 7/1994 | Kang et al. | 358/451 |
| 5,604,846 | 2/1997 | Kadota | 395/114 |
| 5,704,019 | 12/1997 | Akiyama et al. | 358/451 |

FOREIGN PATENT DOCUMENTS

| | | | |
|---|---|---|---|
| 363204 | 10/1989 | European Pat. Off. | G09G 1/28 |
| 517385 | 5/1992 | European Pat. Off. | H04N 5/44 |
| 735741 | 10/1996 | European Pat. Off. | H04N 1/405 |

*Primary Examiner*—Jon Chang
*Assistant Examiner*—Jingge Wu
*Attorney, Agent, or Firm*—Rabin & Champagne, P.C.

[57] ABSTRACT

The resolution of a dot image is converted by converting each input line of dots to a fixed number of output lines of dots. In each output line, different input dots give rise to different numbers of output dots. Within the fixed number of output lines generated from each input line, each input dot gives rise to different numbers of output dots in different output lines, but every input dot gives rise to the same total number of output dots.

11 Claims, 6 Drawing Sheets

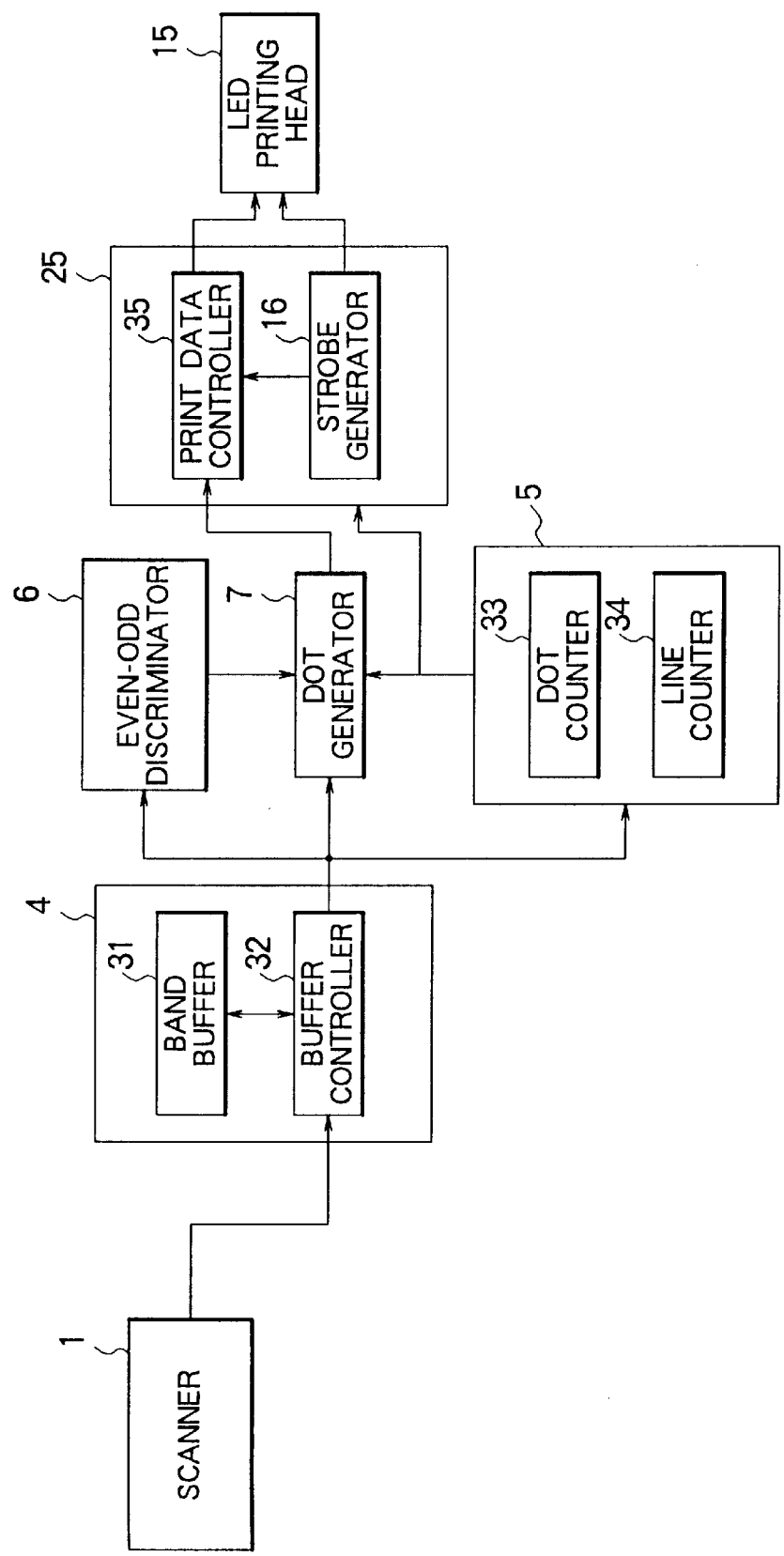

RESOLUTION CONVERTER FOR DOT IMAGES

BACKGROUND OF THE INVENTION

The present invention relates to a method and apparatus for converting the resolution of an image comprising lines of dots.

The invention addresses the problem faced, for example, by a facsimile machine having a printing unit that prints three hundred dots per inch, when facsimile data with a resolution of two hundred dots per inch are received. The conventional solution to this problem has been to convert the resolution by duplicating the dots in fixed rows and columns. For example, the horizontal resolution can be converted by printing the odd-numbered dots in each line twice and printing the even-numbered dots once, while the vertical resolution can be converted by printing odd-numbered lines twice and even-numbered lines once.

As will be illustrated later, however, this conventional scheme has the defect of distorting the gray scale of images in which different gray levels are represented by different proportions of black dots. Similar tonal distortions occur if the conventional scheme is used to convert the dot resolution of color images.

SUMMARY OF THE INVENTION

It is accordingly an object of the present invention to convert the resolution of an image formed from lines of dots, without tonal distortion of the image.

The invented resolution conversion method converts each input line of dots to a fixed number of output lines of dots. The fixed number is at least two. In each output line, different numbers of output dots are generated from different input dots. Within the fixed number of output lines generated from each input line, different numbers of output dots are generated from the same input dot in different output lines. The same total number of output dots, however, is generated from every input dot.

The invented resolution converter comprises a discriminator for generating a discrimination signal by counting the dots in each input line modulo a fixed integer greater than one, and a dot generator for generating output lines as described above, responsive to the discrimination signal.

BRIEF DESCRIPTION OF THE DRAWINGS

In the attached drawings:

FIG. 9 illustrates another variation of the embodiment in FIG. 1.

DETAILED DESCRIPTION OF THE INVENTION

The invention will now be described through examples with reference to the attached illustrative drawings.

Figure 1:
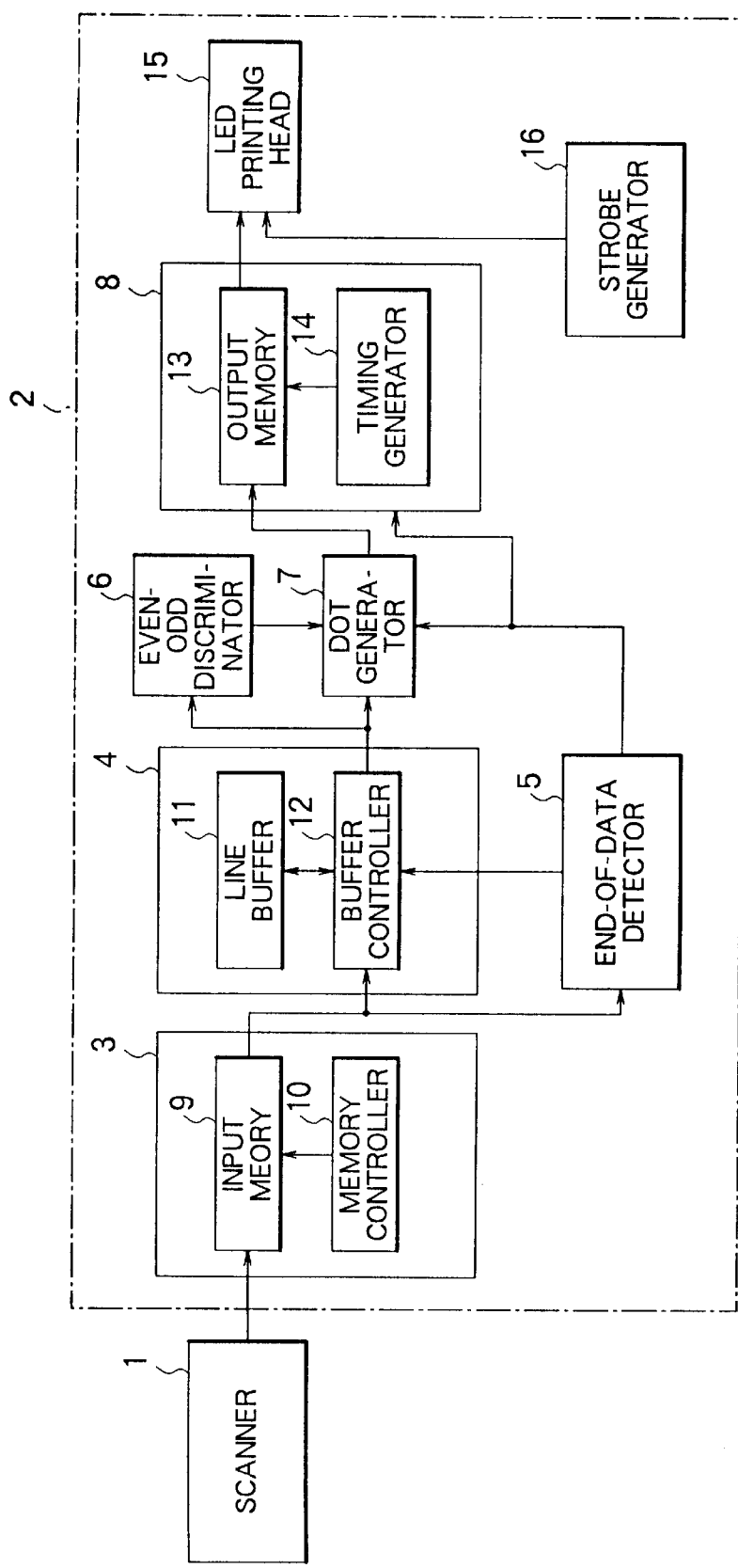
FIG. 1 is a block diagram of an embodiment of the invention.

In FIG. 1, a scanner 1 with a resolution of two hundred dots per inch (200 DPI) scans an image or other subject copy and sends the resulting lines of dot data to a resolution converter 2 embodying the present invention. The scanner 1 may be an independent flatbed scanner or drum scanner, or a scanner built into a facsimile machine. The resolution converter 2 may be part of another facsimile machine, or part of a computing device such as a personal computer. The resolution converter 2 may also receive dot data from a computing device or computer network, instead of from the scanner 1. The data transferred from the scanner 1 to the resolution converter 2 represent images such as facsimile pages. One dot in an image is presented by one bit of data.

The resolution converter 2 comprises a data input section 3, a data buffering section 4, an end-of-data detector 5, an even-odd discriminator 6, a dot generator 7, and a data output section 8.

The data input section 3 comprises an input memory 9 and a memory controller 10. The input memory 9 comprises, for example, one or more dynamic random-access memory (DRAM) or static random-access memory (SRAM) devices, or a rotating magnetic disk or the like. The memory controller 10 is an electronic circuit that controls access to the input memory 9.

The data buffering section 4 comprises a line buffer 11 and a buffer controller 12. The line buffer 11 comprises, for example, a shift register, or part of a DRAM or SRAM device. The buffer controller 12 is an electronic circuit that controls access to the line buffer 11. The buffer controller 12 receives dot data from the input memory 9, stores the data in the line buffer 11, and transfers data from the line buffer 11 to the even-odd discriminator 6 and dot generator 7.

The end-of-data detector 5 monitors the data transferred from the input memory 9 to the buffer controller 12, and from the buffer controller 12 to the even-odd discriminator 6 and dot generator 7, detects the end of each line of dots, detects the end of each image, and notifies the buffer controller 12.

The even-odd discriminator 6 is, for example, a modulo-two counter such as a one-bit counter that, by counting the bits of data transferred from the buffer controller 12 modulo two, determines whether each bit represents an odd-numbered or even-numbered dot in the current line. The even-odd discriminator 6 outputs a discrimination signal such as a one-bit signal that takes on values of '1' and '0'

The dot generator 7 receives input dot data from the buffer controller 12, and generates output dot data under control of the end-of-data detector 5 and even-odd discriminator 6, as will be described later.

The data output section 8 comprises an output memory 13 and a timing generator 14. The output memory 13 stores the dot data generated by the dot generator 7. The timing generator 14 generates various signals such as clock signals that control the transfer of data to and from the output memory 13.

In addition, the resolution converter 2 comprises a light-emitting-diode (LED) printing head 15 that receives the dot data output from the output memory 13, and a strobe generator 16. The LED printing head 15 has an array of light-emitting diodes that print the received data by well-known electrophotographic methods, by illuminating a photosensitive drum (not visible). The strobe generator 16 generates strobe signals that control the printing operation.

Next, the operation of the apparatus in FIG. 1 will be described with reference to FIGS. 1 to 6.

Figure 2:
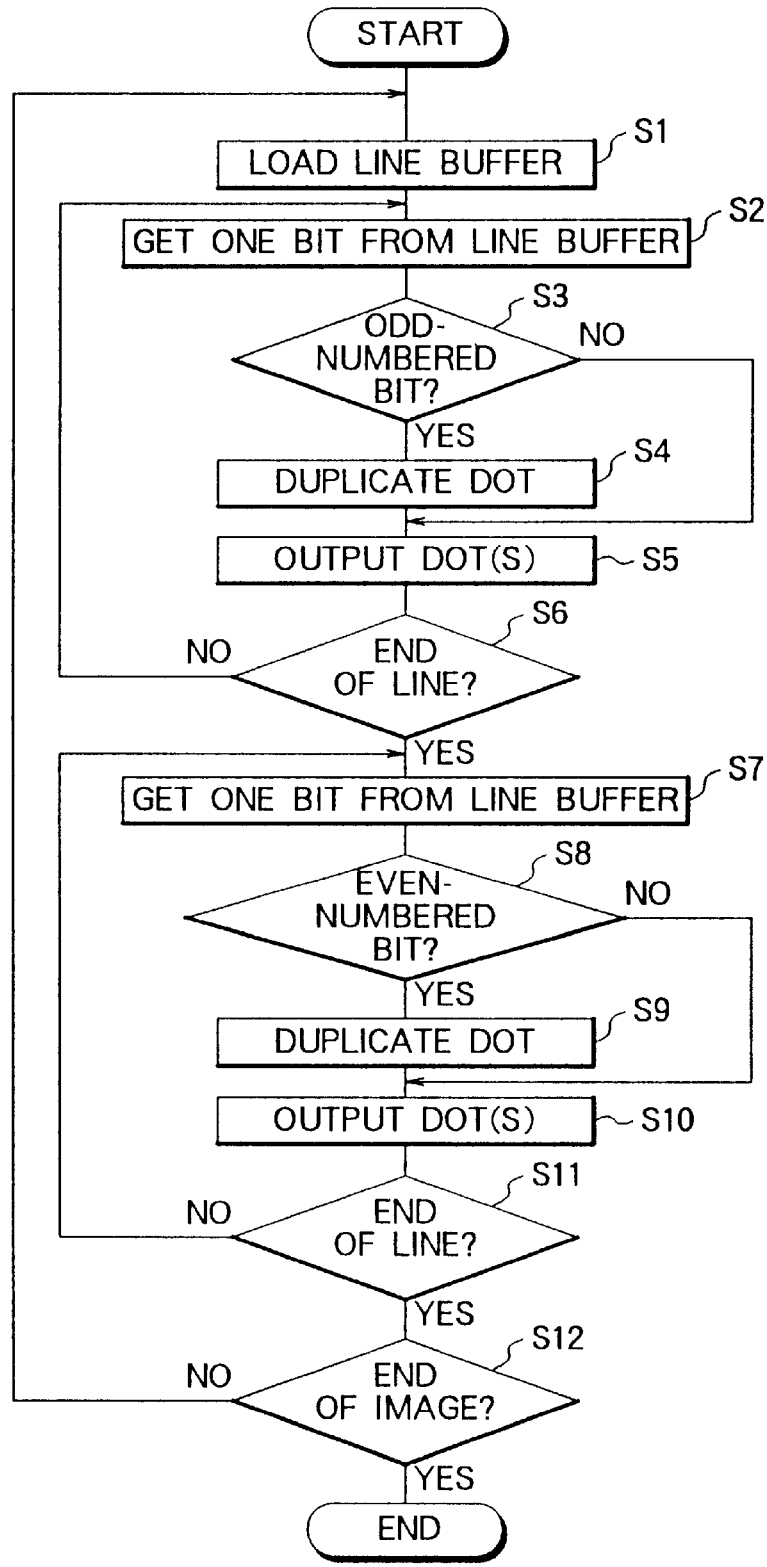
FIG. 2 is a flowchart illustrating the operation of the embodiment in FIG. 1.

Image data produced by the scanner 1 or another source are stored in the input memory 9 under control of the memory controller 10, read from the input memory 9 a line at a time, and converted according to the flowchart in FIG. 2. First, the memory controller 10 transfers one line of data from the input memory 9 to the line buffer 11 (step S1). Data are then read from the line buffer 11 and converted in a processing loop comprising steps S2, S3, S4, S5, and S6, starting with the first data bit in the line buffer 11 and proceeding one bit at a time.

In step S2, the buffer controller 12 transfers one bit from the line buffer 11 to the even-odd discriminator 6 and dot generator 7. In step S3, the even-odd discriminator 6 determines whether the bit is an odd-numbered bit or an even-numbered bit and notifies the dot generator 7. For example, the even-odd discriminator 6 sends the dot generator 7 a discrimination signal with a value of '1' for odd-numbered bits and '0' for even-numbered bits.

If the bit is odd-numbered, the dot generator 7 duplicates the dot in step S4 by generating one more bit with the same value. If the bit is even-numbered, the dot generator 7 skips step S4 and leaves the bit unduplicated, so that only one dot is generated from the bit. In step S5, the dot generator 7 sends the value of the bit once (if step S4 was skipped) or twice (if step S4 was executed) to the data output section 8, to be written into the output memory 13.

In step S6, the end-of-data detector 5 determines whether the current bit is the last bit in the line. If the current bit is not the last bit in the line, the operation returns to step S2 to process the next bit in the line.

When the end-of-data detector 5 indicates in step S6 that the last bit in the line has been reached, the operation exits the loop from step S2 to step S6 and enters a similar loop from step S7 to step S11 in which the bits in the line buffer 11 are again processed one by one, starting once more from the first bit. The dots generated in this loop constitute a new line of output data. In step S7, the buffer controller 12 transfers one bit from the line buffer 11 to the even-odd discriminator 6 and dot generator 7. In step S8, the even-odd discriminator 6 decides whether the bit is odd-numbered or even-numbered. If the bit is even-numbered, the dot generator 7 duplicates the dot in step S9 by generating another bit with the same value, and sends this value twice to the data output section 8 in step S10. If the bit is odd-numbered, the dot generator 7 skips step S9 and sends the value of the bit only once to the data output section in step S10. In step S11, the end-of-data detector 5 determines whether the current bit is the last bit in the line, and the operation returns to step S2 to process the next bit in the line if the current bit is not the last bit.

When the end-of-data detector 5 finds in step S11 that the last bit in the line has been reached, the end-of-data detector 5 next determines whether the end of the image has been reached (step S12). If the end of the image has not been reached, the operation returns to step S1 to process the next line of data.

Since two output dot lines are generated from each dot line in the input image, when the output image is printed by the LED printing head 15, the vertical dot resolution is doubled. If the input image has two hundred lines per inch, the output image is printed with four hundred lines per inch. This vertical resolution conversion can be effected easily by controlling the rotational speed of the above-mentioned photosensitive drum.

In the horizontal direction, the output image has 1.5 times as many dots as the input image, as desired if the input dot resolution is two hundred dots per inch but the resolution of the LED printing head 15 is three hundred dots per inch.

Figure 3:
FIG. 3 illustrates a line of input image data.
Figure 4:
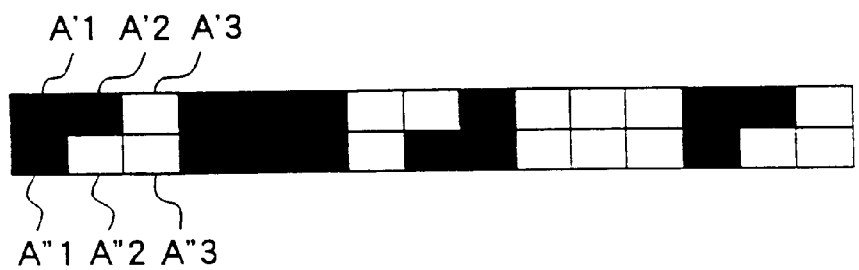
FIG. 4 illustrates the converted output image data generated from this line of input image data.

FIG. 3 illustrates a line of input image data that starts with a black dot A1, followed by a white dot A2 and then other black and white dots. FIG. 4 illustrates the corresponding pair of lines of output data. In the first line of output data, the processing loop from steps S2 to S6 generates two dots from each odd-numbered input dot, and one dot from each even-numbered input dot, so two black dots A'1 and A'2 are generated from input dot A1, and one white dot A'3 is generated from input dot A2. In the second line of output data, the processing loop from steps S7 to S11 generates one dot from each odd-numbered input dot, and two dots from each even-numbered input dot, so one black dot A"1 is generated from input dot A1, and two white dots A"2 and A"3 are generated from input dot A2. In all, three output dots are generated from each input dot.

Figure 5:
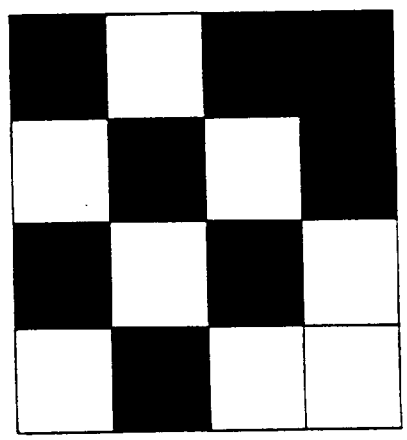
FIG. 5 illustrates a block of input image data.
Figure 6:
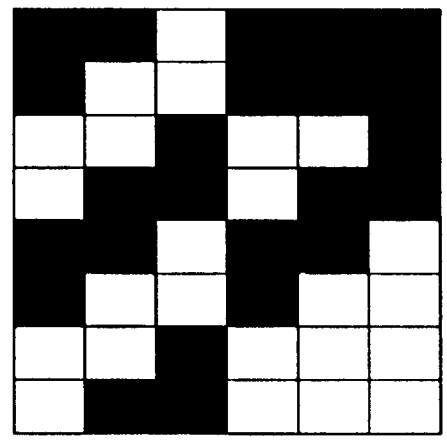
FIG. 6 illustrates a corresponding block of output image data converted according to the invention.

FIG. 5 illustrates a four-by-four-dot part of an input image. Eight of the sixteen constituent dots are black. FIG. 6 illustrates the converted image output by the invented resolution converter as described above, comprising eight lines of six dots each. Twenty-four of the forty-eight dots are black. Accordingly, in both the input and output images half of the dots are black, and if the input image represents a shade of gray, the output image represents the same shade of gray.

Figure 7:
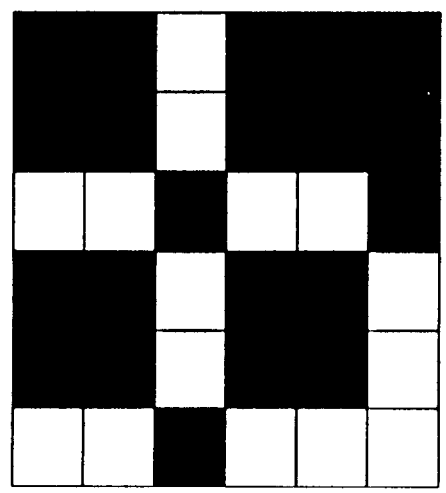
FIG. 7 illustrates a corresponding block of output image data converted according to the conventional scheme.

FIG. 7 illustrates the result of converting the image in FIG. 5 by the conventional method of printing odd-numbered dots and dot lines twice. The output image has six lines of six dots each, but twenty-one of the thirty-six constituent dots are black. The gray level has accordingly been altered from one-half to seven-twelfths.

While this is only one example, it should be clear from the foregoing description that the invention generates the same number of output dots from every input dot, regardless of whether the dot is even or odd, and regardless of whether the dot is disposed in an even or odd line. Thus the invention always preserves the gray scale of the image, while the conventional method does not.

Figure 8:
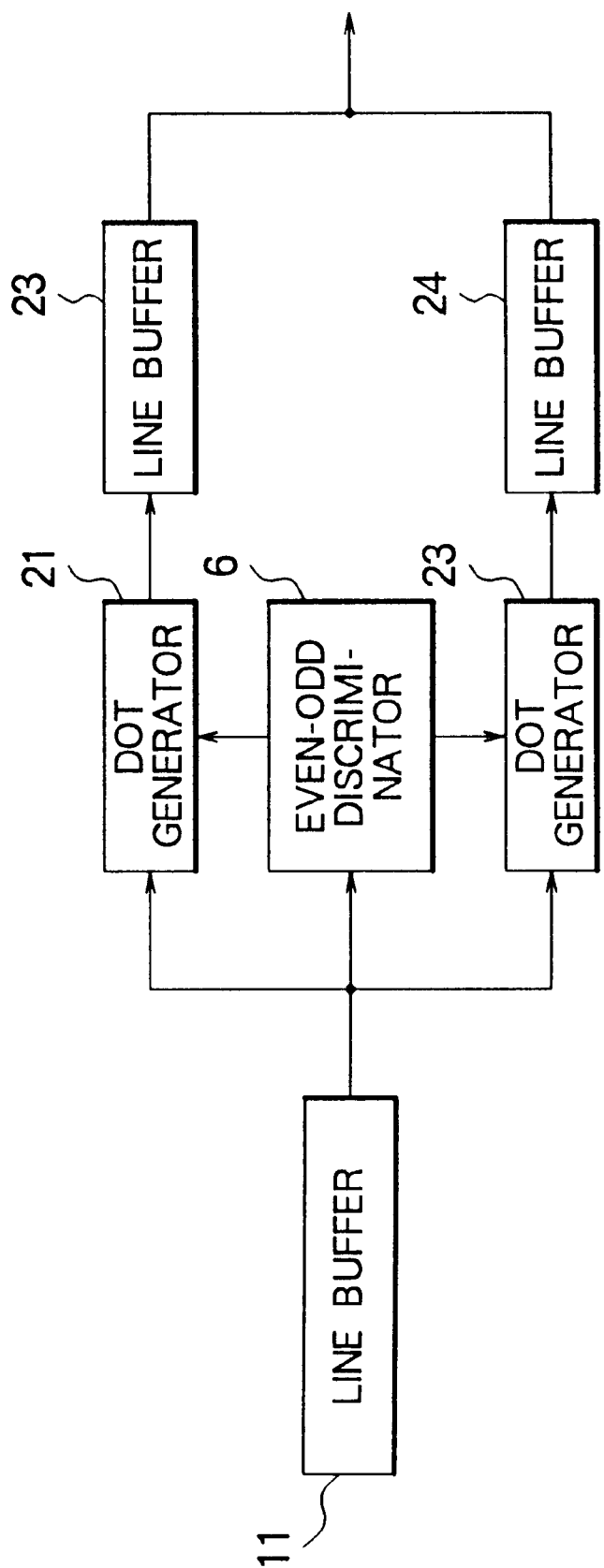
FIG. 8 illustrates a variation of the embodiment in FIG. 1.

FIG. 8 illustrates a variation of the dot-generating part of the invented resolution converter. In this variation, bits of data are transferred from the line buffer 11 to the even-odd discriminator 6 and to a pair of dot generators 21 and 22, each of which receives the even-odd discrimination signal output by the even-odd discriminator 6. Dot generator 21 executes steps S3 to S5 in FIG. 2, generating two dots from each odd-numbered bit and one dot from each even-numbered bit, and stores the resulting output data in a first output line buffer 23. Dot generator 22 concurrently executes steps S8 to S10, generating one dot from each odd-numbered bit and two dots from each even-numbered bit, and stores the resulting output data in a second output line buffer 24. When the end of the line of data in the input line buffer 11 is reached, the timing generator 14 in FIG. 1 transfers the output data from the output line buffers 23 and 24 into the output memory 13. By generating two lines of output data at once, this variation enables image data to be converted approximately twice as fast as in FIG. 1.

FIG. 9 illustrates another variation, in which input image data are supplied directly to the data buffering section 4 instead of to an input memory, and converted output image data are supplied to a printing controller 25 instead of to an output memory. The data buffering section 4 comprises a band buffer 31 capable of storing a certain number of lines of image data, but not necessarily an entire image. A buffer controller 32 in the data buffering section 4 controls access to the band buffer 31. The end-of-data detector 5 comprises a dot counter 33 that counts dots to determine the beginning and end of each line, and a line counter 34 that determines the end of the image. The even-odd discriminator 6 and dot generator 7 are as described in FIG. 1. The printing controller 25 comprises the strobe generator 16 shown in FIG. 1, and a print data controller 35. The print data controller 35 accepts dot data directly from the dot generator 7, and feeds the data at appropriate timings to the LED printing head 15.

Data conversion in this variation is carried out in the same way as described in FIGS. 1 to 6, but the conversion is carried out as the data are received in the band buffer 31, and the lines of converted data are printed as soon as generated by the dot generator 7. This variation has the advantage of requiring less memory than in FIG. 1, and the further advantage of operating faster, since less time is spent in transferring data from one storage location to another.

As a somewhat similar variation, the data buffering section 4 in FIG. 1 can be eliminated, instead of the data input section 3, and the memory controller 10 can supply data directly from the input memory 9 in FIG. 1 to the even-odd discriminator 6 and dot generator 7.

The invention is not limited to use with an LED printing head, but is useful with any type of dot printing device.

The invention is not limited to conversion from two hundred dots per inch to three hundred dots per inch. In principle, the invented method can be used to convert between any two different dot resolutions.

To give one example, to convert from three hundred dots per inch to two hundred dots per inch, the invented resolution converter can generate three output dot lines from each input dot line. The input dots are now distinguished by counting modulo three, every three input dots producing two output dots per line. If A, B, and C are the first three input dots in a line, then the corresponding output dots are, for example, AB in the first output line, AC in the second output line, and BC in the third output line, each input dot generating a total of two output dots in the three output lines.

To give another example, conversion from one hundred eighty dots per inch to three hundred dots per inch is also possible by generating three output dot lines from each input dot line. If A, B, and C are three consecutive input dots, then the corresponding output dots are, for example, AABBC in the first output line, AABCC in the second output line, and ABBCC in the third output line, each input dot generating a total of five output dots.

To give still another example, conversion from one hundred twenty dots per inch to three hundred dots per inch is possible by generating two output lines from each input line, the output dot pattern being AABBB in the first output line and AAABB in the second output line, where A is an odd-numbered input dot and B is the following even-numbered input dot.

Those skilled in the art will recognize that further variations are possible within the scope claimed below.

What is claimed is:

1. A method of converting the dot resolution of an image formed by input lines of dot data, comprising:

generating, from each input line of dot data, a first fixed number, greater than one, of output lines of dot data; wherein for each input dot in each of said input lines of dot data, a second fixed number of output dots is generated in said fixed number of output lines and wherein in each output line of dot data, different numbers of said output dots are generated from adjacent ones of said input dots; and from said each input dot, different numbers of said output dots are generated in different output lines among said first fixed number of output lines of dot data.

2. The method of claim 1, comprising the further step of counting the input dots in each input line of dot data modulo a fixed integer greater than one to generate a discrimination signal, the different numbers of output dots generated in each output line of dot data being generated responsive to said discrimination signal.

3. The method of claim 1, wherein said first fixed number is two.

4. The method of claim 3, wherein:

each said input line of dot data comprises odd-numbered input dots alternating with even-numbered input dots;

from each said input line of dot data there are generated two output lines of dot data, comprising a first line and a second line;

in said first line, a third fixed number of output dots are generated from each odd-numbered input dot, and a fourth fixed number of output dots are generated from each even numbered input dot; and in said second line, said fourth fixed number of output dots are generated from each odd-numbered input dot, and said third fixed number of output dots are generated from each even-numbered input dot, said second fixed number being the sum of said third fixed number and said fourth fixed number.

5. The method of claim 1, comprising the further step of printing said output lines at a reduced line-to-line spacing, as compared with the input lines of dot data in said image.

6. The method of claim 1, wherein said fixed number of output lines of dot data are generated concurrently.

7. A resolution converter for converting the dot resolution of an image formed by input lines of dot data, comprising:

a discriminator for counting dots in each of said input lines modulo a fixed integer greater than one, thereby generating discrimination signal; and a dot generator coupled to said discriminator, for generating, from each input line of dot data, a first fixed number, greater than one, of output lines of dot data; wherein for each input dot in each of said input lines of dot data, a second fixed number of output dots is generated in said fixed number of output lines and wherein in each of said output lines, said dot generator generates different numbers of said output dots from adjacent ones of said input dots, responsive to said discrimination signal; and from said each input dot, said dot generator generates different numbers of said output dots in different output lines.

8. The resolution converter of claim 7, wherein said fixed integer is two, said discrimination signal thus discriminating between odd-numbered dots and even-numbered dots.

9. The resolution converter of claim 8, wherein:

said first fixed number is two, said dot generator thus generating from each said input line of dot data two output lines, comprising a first line and a second line;

in said first line, said dot generator generates a third fixed number of output dots from each odd-numbered input dot, and a fourth fixed number of output dots from each even-numbered input dot; and in said second line, said dot generator generates said fourth fixed number of output dots from each odd-numbered input dot, and said third fixed number of output dots from each even-numbered input dot.

10. The resolution converter of claim 7, further comprising a printing apparatus for printing said output lines at a reduced line-to-line spacing, as compared with the input lines of dot data in said image.

11. The resolution converter of claim 7, wherein said dot generator generates all of said fixed number of output lines of dot data concurrently.

* * * * *